United States Patent
Tan et al.

(10) Patent No.: US 6,750,973 B2
(45) Date of Patent: Jun. 15, 2004

(54) TEST STRUCTURE FOR SIMULTANEOUSLY CHARACTERIZING TWO PORTS OF AN OPTICAL COMPONENT USING INTERFEROMETER-BASED OPTICAL NETWORK ANALYSIS

(75) Inventors: Tun Sein Tan, Palo Alto, CA (US); Douglas M. Baney, Palo Alto, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 323 days.

(21) Appl. No.: 10/081,774

(22) Filed: Feb. 20, 2002

(65) Prior Publication Data

US 2003/0156295 A1 Aug. 21, 2003

(51) Int. Cl.[7] ............................ G01B 9/02; G01N 21/00
(52) U.S. Cl. ........................................ 356/477; 356/73.1
(58) Field of Search ................................ 356/477, 73.1; 385/12

(56) References Cited

U.S. PATENT DOCUMENTS

| | | | |
|---|---|---|---|
| 5,844,235 A | 12/1998 | Tachikawa et al. | |
| 5,896,193 A | 4/1999 | Colbourne et al. | |
| 6,177,985 B1 | 1/2001 | Bloom | |
| 6,317,214 B1 * | 11/2001 | Beckett et al. | ............... 356/450 |
| 6,323,950 B1 * | 11/2001 | Kim et al. | ................... 356/477 |

\* cited by examiner

*Primary Examiner*—Samuel A. Turner
*Assistant Examiner*—Patrick Connolly (57) ABSTRACT

A test structure supports simultaneous characterization of a two port optical component. The test structure includes an input port for receiving an input signal from an optical source, two test ports for connecting the test structure to a component under test, separate optical paths for supplying reflected and transmitted optical response signals from the component under test to separate receivers, and optical components for combining a first portion of the input signal with the reflected optical response signal before the first portion of the input signal and the reflected optical response signal are detected by a first receiver and for combining a second portion of the input signal with the optical response signal before the second signal and the optical response signal are detected by a second receiver. The optical component of the test structure may be connected by optical fibers or integrated into a single substrate.

23 Claims, 4 Drawing Sheets

TEST STRUCTURE FOR SIMULTANEOUSLY CHARACTERIZING TWO PORTS OF AN OPTICAL COMPONENT USING INTERFEROMETER-BASED OPTICAL NETWORK ANALYSIS

FIELD OF THE INVENTION

The invention relates to systems for characterizing optical components, and more particularly to systems for characterizing optical components using interferometer-based optical network analysis.

BACKGROUND OF THE INVENTION

Figure 1:
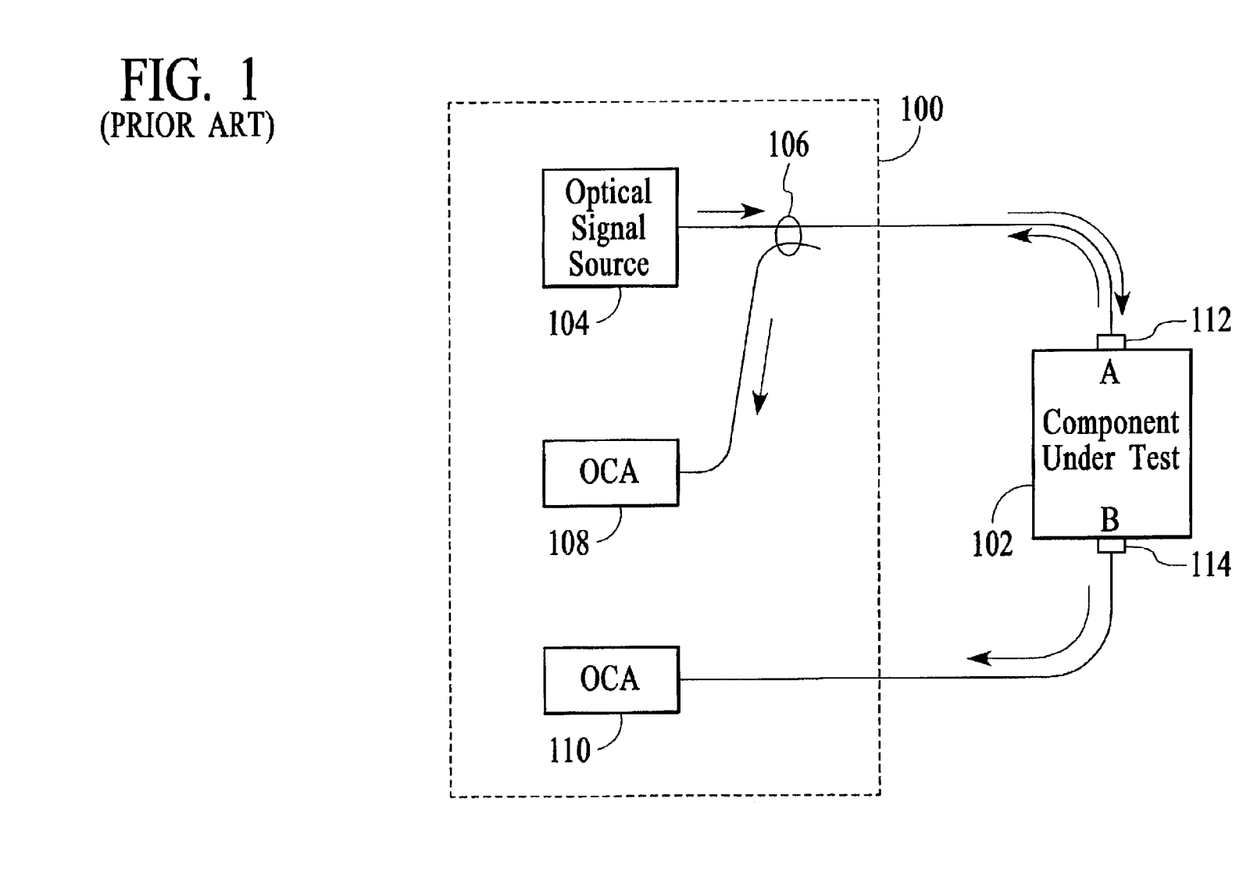
FIG. 1 depicts a basic block diagram of a test system for characterizing a two port optical component using direct detection of the reflected and transmitted optical response signals as is known in the prior art.

Characterizing two ports of an optical component involves inputting an optical signal into one of the ports and measuring the optical response signals that exit the two ports of the optical component. In a two port configuration, one optical response signal results from reflection by the optical component and the other optical response signal results from transmission through the optical component. FIG. 1 depicts a basic block diagram of a test system 100 for characterizing a two port optical component 102, where the optical component is commonly referred to as the component under test or the device under test (DUT). The test system includes an optical signal source 104, a coupler 106, and two optical component analyzers (OCAs) 108 and 110. The optical signal source is optically connected to one port (i.e., the input port) 112 of the optical component so that an input signal can be applied to the optical component. One of the OCAs is optically connected to the input port of the optical component via the coupler. The coupler allows the OCA 108 to receive the optical response signal that results from reflection of the input signal by the optical component. The other OCA 110 is optically connected to the output port 114 of the optical component to receive the optical response signal that results from transmission of the input signal through the optical component. Because the test system includes two OCAs, both ports of the optical component can be simultaneously characterized.

In the above-described test system, the optical signal source provides an input optical signal (also referred to a stimulus) to the optical component and the optical response signals that result from the input optical signal are directly measured by the OCAs. That is, the optical response signals are not combined or mixed with any other optical signals before being detected by the OCAs. Although this direct measurement technique for characterizing an optical component works well for measuring the scalar quantities, such as bandwidth, insertion loss, and gain or loss of the component under test, the resolution and bandwidth range that can be achieved by direct measurement of the optical response signals is limited. In addition, the direct measurement technique cannot be used to characterize the dispersion properties of the component under test. Measuring the dispersion properties of the component under test in this case requires the use of additional specialized equipment.

The desire to multiplex more, and therefore narrower, channels into a single optical fiber to achieve cost effective data transfer at very high data rates has driven the need for higher resolution optical network analysis techniques that are able to efficiently characterize the dispersion properties of an optical component. One high resolution optical spectrum analysis technique, known as interferometer-based optical spectrum analysis, involves combining two optical signals and measuring the interference signal that results from combining the two signals. Test systems that utilize interferometric optical spectrum analysis to characterize an optical component are known. However, these test systems only allow the characterization of one port of a component under test at a time and cannot characterize the dispersion properties of the component under test. For example, known test systems can either characterize reflection at the input port of a component under test or transmission at the output port of the component under test. To characterize the other port of the component under test, the optical component must be disconnected from the test system, reoriented, and then reconnected to the test system. Although each port of an optical component can be tested serially by adjusting the orientation of the optical component, it is desirable to be able to simultaneously characterize at least two ports of an optical component using interferometer-based optical spectrum analysis without having to adjust the orientation of the component under test.

In view of the limitations of known systems for characterizing optical components, what is needed is a system for characterizing an optical component that allows simultaneous interferometric analysis of a component under test in reflection and transmission.

SUMMARY OF THE INVENTION

A test structure that supports simultaneous characterization of a two port optical component optically connects an optical local oscillator source, receivers, and a signal processor to the optical component that is to be tested, also referred to as the component under test or the DUT. The test structure includes an input port for receiving an input signal from the optical local oscillator source, two test ports for connecting the test structure to a component under test, separate optical paths for receiving reflected and transmitted optical response signals from the component under test, and optical components for combining a first portion of the input signal with the reflected optical response signal and for combining a second portion of the input signal with the transmitted optical response signal. The local oscillator source provides the input signal to the component under test, the receivers convert the combined optical signals into electrical signals, and the signal processor processes the electrical signals to generate output signals that are indicative of an optical characteristic of the component under test. Because the optical response signals are combined with portions of the input signal before being converted to electrical signals, interferometer-based optical network analysis (also known as swept homodyne analysis) can be used to obtain high resolution optical characterization of the component under test. The swept homodyne technique allows the characterization of both loss and dispersion properties in the relevant wavelength range of the component under test.

In an embodiment of the test structure, optical couplers connected by optical fibers are utilized to combine the input signal and optical response signals and in another embodiment of the test structure, the optical couplers and optical paths are integrated into a single substrate.

A switch can be added between the input port and the two test ports to enable the component under test to be tested in two directions without having to reverse the orientation of the component under test relative to the test structure. In an embodiment where the optical couplers are connected by optical fibers, a 1×2 switch is integrated into the test structure. In a single substrate test structure, the switch is externally connected to intermediate switch ports.

Other aspects and advantages of the present invention will become apparent from the following detailed description, taken in conjunction with the accompanying drawings, illustrating by way of example the principles of the invention.

DETAILED DESCRIPTION

Figure 2:
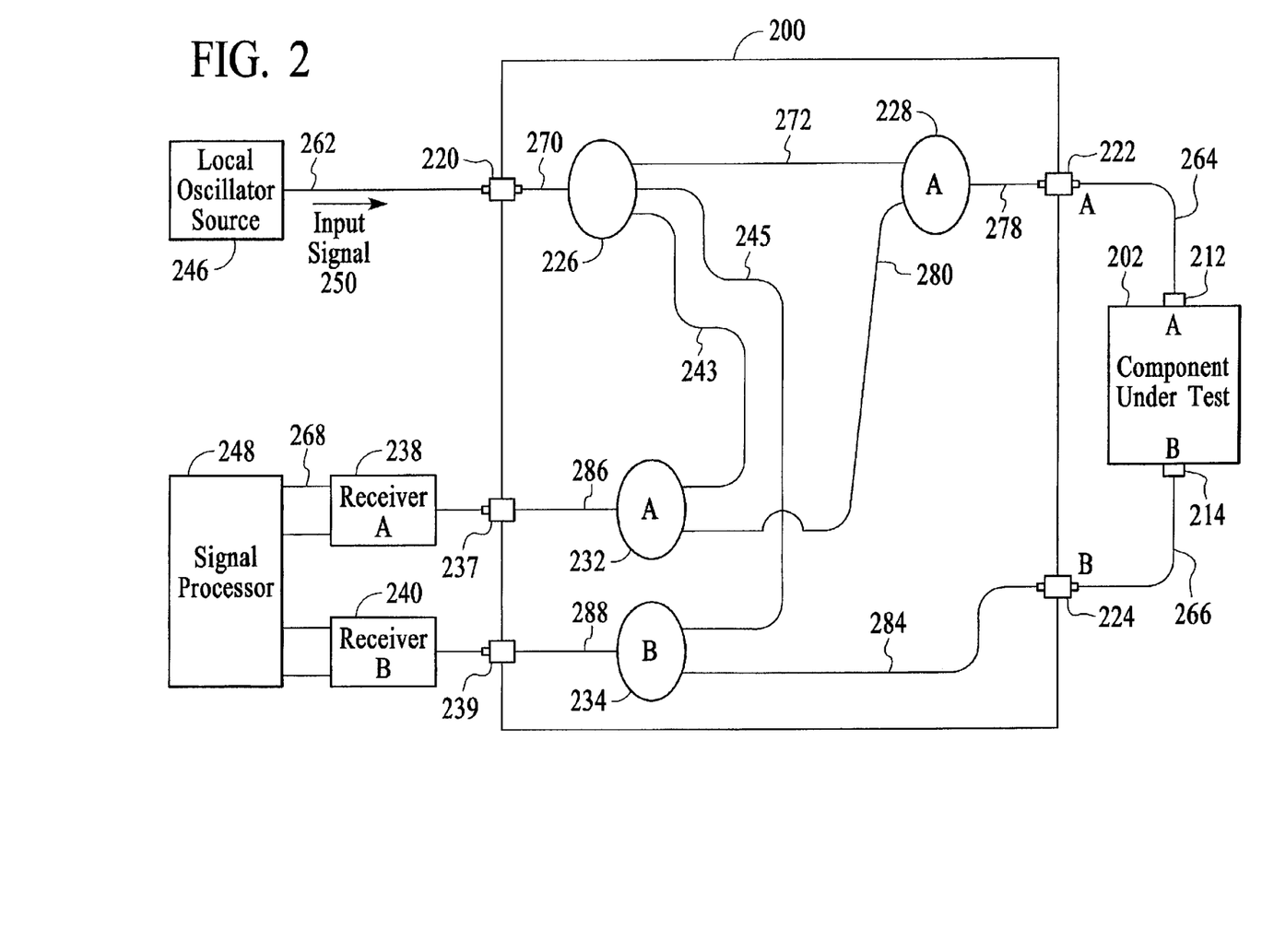
FIG. 2 depicts an embodiment of a test structure that supports the simultaneous characterization of a two port optical component using interferometer-based optical network analysis in accordance with an embodiment of the invention.

FIG. 2 depicts an embodiment of a test structure 200 that supports the simultaneous characterization of a two port optical component using interferometer-based optical network analysis. The test structure includes an input port 220, first and second test ports 222 and 224, first and second receiver ports 237 and 239, and multiple couplers 226, 228, 232, and 234. The test structure connects a local oscillator source 246, two receivers 238 and 240, and a signal processor 248 to the optical component 202 that is to be tested, also referred to as the component under test or the DUT. The local oscillator source provides an input signal 250 to the component under test, the receivers convert optical response signals that are generated in response to reflection and transmission of the input signal into electrical signals, and the signal processor processes the electrical signals. In the embodiment of FIG. 2, the components of the test structure are incorporated within a housing, such as a metal or plastic housing, although they could be incorporated into an integrated waveguide as is described below. The test structure is connected to the local oscillator source, to the receivers, and to the component under test through optical connections, such as optical fibers.

The local oscillator source 246 generates the input signal 250 (also referred to as a local oscillator signal) that is input into the test structure at the input port 220. In an embodiment, the local oscillator source is a highly coherent tunable laser that is tunable over a wavelength range of one nanometer or greater. To characterize the performance of an optical component over a specific range of frequencies or wavelengths, the local oscillator source generates an input signal that is swept across the specific range of frequencies, or wavelengths. In an embodiment, the sweep rate of the input signal at 1,550 nanometers is approximately 40 nm/s or 6.15 MHz/µs and the sweep range is approximately 100 nm, however the sweep rate and sweep range can be higher or lower.

The input port 220 of the test structure 200 is optically connected to receive the input signal 250 from the local oscillator source 246. Within the test structure, the input port is optically connected by optical path 270 to a coupler 226 (referred to herein as the input coupler) that splits the input signal into three portions. Throughout this description, an optical connection or path includes any structure (i.e., optical fibers or planar waveguides) or technique that is used to deliver an optical signal between two points. In the embodiment of FIG. 2, the input coupler is a 1×3 coupler that splits the input signal into three portions, with one portion being supplied to the component under test 202, another portion being supplied to receiver 238 (referred to herein as receiver A), and another portion being supplied to receiver 240 (referred to herein as receiver B).

Following the portion of the input signal that is supplied to the component under test 202, the input coupler 226 is optically connected by optical path 272 to a 2×2 coupler, referred to herein as test coupler A 228. Test coupler A is optically connected by optical path 278 to test port A 222 and by optical path 280 to a 2×1 coupler 232 that is associated with receiver A (referred to herein as receiver coupler A). Test coupler A and optical paths 272 and 278 optically connect the input coupler 226 to test port A so that the input signal can be delivered to component port A 212 of the component under test. Test coupler A also optically connects the test port A to receiver coupler A so that a reflected optical response signal is delivered to receiver coupler A and ultimately to receiver A 238.

When the input signal 250 is delivered to component port A 212 of the component under test 202, a reflected optical response signal is directed to receiver coupler A 232 and a transmitted optical response signal is directed to receiver coupler B 234. The reflected optical response signal reaches receiver coupler A 232 via optical path 264, test port A 222, optical path 278, test coupler A 228, and optical path 280. The transmitted optical response signal reaches receiver coupler B 234 via optical path 266, test port B 224, and optical path 284. At the receiver couplers, the optical response signals are combined with the portions of the input signal that were split from the incoming input signal at the input coupler 226 and delivered via optical paths 243 and 245, respectively. The receiver couplers combine the respective portions of the input signal and the optical response signal and deliver the combined optical signals to the respective receivers via optical paths 286 and 288 and receiver ports 237 and 239.

In the embodiment of FIG. 2, the optical couplers 226, 228, 232, and 234 are optically directional 3 dB fiber couplers, although other optical couplers may be utilized. As described herein, the couplers may perform splitting functions, coupling functions, or splitting and coupling functions. In an embodiment, the optical couplers are substantially independent of the wavelength and polarization of the input signal. In an embodiment, the optical couplers are single mode couplers.

The test ports A 222 and B 224 enable the component under test 202 to be optically connected to the test structure 200. The test ports may be fiber mating sleeve or fiber connectors. In the embodiment of FIG. 2, the test ports are optically connected to the component under test by optical fibers 264 and 266.

The receivers 238 and 240 are optically connected to the receiver ports 237 and 239 to receive the combined optical signals from the receiver couplers 232 and 234, respectively. In an embodiment, the receivers utilize square law detection, which results in mixing of the combined input and optical response signals. Mixing of the combined optical signals originating from the same local oscillator source 246 produces a homodyne beat signal at a frequency that is determined by the local oscillator signal frequency, the sweep rate of the local oscillator signal, and the differential delay of the two interfering signals at the receiver coupler. Since both interfering signals at the receiver couplers originated from a coherent source (i.e., the local oscillator source), the resulting signal has a quadratic phase behavior resulting from the linearly changing frequency of the homodyne beat signal. Homodyne beat signal data generated by the receivers represents both amplitude and phase characteristics of the component under test at the respective component ports. The homodyne beat signal data is provided to the signal processor 248 via the electrical connections 268. In the embodiment of FIG. 2, the receivers are polarization diversity receivers. The polarization diversity receivers include circuits for producing output signals that are independent of the polarization state of the input signal. Polarization diversity receivers are known and their operation is not described further. In the embodiment of FIG. 2, each of the polarization diversity receivers outputs two electrical signals that are representative of the optical response signals. Although the receivers are shown in FIG. 2 as external to the test structure 200, the receivers may be integrated into the test structure.

The signal processor 248 includes a multifunction processor that receives electrical signals from the two receivers 238 and 240 and generates output signals that are indicative of optical characteristics of the component under test 202. In an embodiment, the signal processor 248 outputs an optical network analysis of optical signals that are reflected from the component under test and transmitted through the component under test. The signal processor may include analog signal processing circuitry, digital signal processing circuitry, software or any combination thereof, as is known in the field of signal processing. In the embodiment of FIG. 2, the signal processor receives digital homodyne beat signal data from the receivers and performs digital processing on the data. In an alternative embodiment, the signal processor receives analog homodyne beat signals from the receivers and converts the analog signals into digital data. The digital data is subsequently processed to generate the output signal.

The signal processor 248 may also be connected to a display (not shown) that can be used to view the generated output signals. The display may provide numerical data, such as wavelength and frequency readings, or graphical data such as waveforms and fringe patterns.

In operation, an input signal 250, such as a swept local oscillator signal, is input into the input port 220 of the test structure 200. The input signal is split into three portions by the input coupler 226, with two portions going to the receiver couplers 232 and 234 and one portion going to the test coupler 228. The portion of the input signal that enters the test coupler continues to travel along a path that includes the test coupler, optical path 278, test port A 222, and optical path 264, and is applied to the component under test at component port A 212. Upon application of the input signal at component port A, a reflected optical response signal exits component port A and a transmitted optical response signal exits component port B. The two optical response signals that exit component port A and component port B in response to the input signal are guided by the respective optical paths to the respective receiver couplers 232 and 234. Each receiver coupler combines a portion of the original input signal with the respective optical response signal and outputs the combined optical signal to the respective receiver 238 and 240. In an embodiment, the combined optical signals are output to the receivers 238 and 240 simultaneously. The two receivers simultaneously output electrical signals that are representative of the optical response signals. The electrical signals are processed by the signal processor 248 to generate output signals that represent transmission and reflection characteristics of the component under test. The direction of the test can be switched by reversing the position of the component under test 202 relative to test ports A and B.

Although a specific arrangement of the couplers and ports has been described, other arrangements of the couplers and ports are possible. For example, the input coupler 226 may be replaced by multiple 1×2 couplers to split the input signal into the desired number of portions. In addition, although the component under test 202 is a two port optical component in the embodiment of FIG. 2, the test structure 200 can be expanded to accommodate a component under test with more than two ports. An expanded test structure may include a switch with the same number of output ports as ports on the component under test and additional test ports, test couplers, receiver couplers, and receivers to match each additional port of the component under test.

Figure 3:
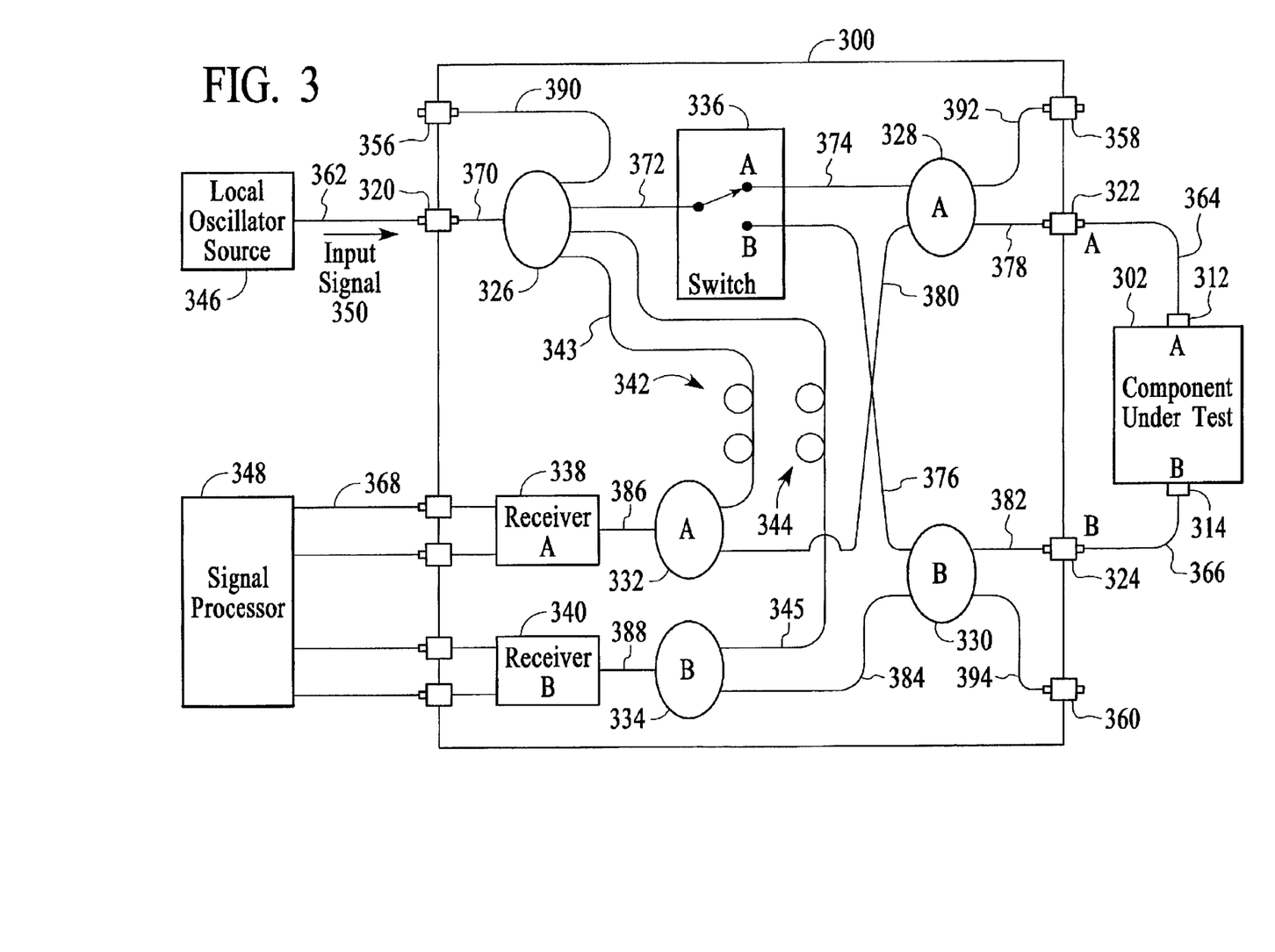
FIG. 3 depicts an embodiment of a test structure, similar to the test structure of FIG. 2, that includes monitoring ports, integrated receivers, and a switch in accordance with an embodiment of the invention.

FIG. 3 depicts another embodiment of a test structure 300 that includes some additional features relative to the test structure of FIG. 2. Specifically, the test structure includes three monitoring ports for monitoring the input signal, receivers that are integrated into the test structure, and a 1×2 switch that enables a component under test to be characterized from two different directions without reversing the position of the component under test relative to the test ports of the test structure. Throughout the description similar reference numbers are used to identify similar elements.

Referring to FIG. 3, the test structure includes an input port 320, first and second test ports 322 and 324, multiple couplers 326, 328, 330, 332, and 334, a switch 336, two receivers 338 and 340, and two polarization controllers 342 and 344. The test structure connects a local oscillator source 346 and a signal processor 348 to the optical component 302 that is to be tested, also referred to as the component under test or the DUT. The local oscillator source provides an input signal 350 to the component under test and the signal processor processes electrical signals that are generated in response to reflection and transmission of the input signal by the component under test. The test structure also includes monitoring ports 356, 358, and 360 that can be used to monitor portions of the input signal that are not applied to the component under test. In the embodiment of FIG. 3, the components of the test structure are incorporated within a housing, such as a metal or plastic housing. The test structure is connected to the local oscillator source and to the component under test through optical connections, such as optical fibers and to the signal processor through electrical connections. The local oscillator source 346 is similar to the local oscillator source 246 described above with reference to FIG. 2.

Referring to the test structure 300, the input port 320 is optically connected to receive an input signal from the local oscillator source 346. Within the test structure, the input port is optically connected by optical path 370 to the input coupler 326 that splits the input signal into multiple portions. In the embodiment of FIG. 3, the input coupler is a 1×4 coupler that splits the input signal into four portions, with one portion being supplied to the component under test 302, another portion being supplied to the first receiver 338, another portion being supplied to the second receiver 340, and another portion being supplied to a monitoring port 356.

Following the portion of the input signal that is supplied to the component under test 302, the input coupler 326 is optically connected to the input of the switch 336 by optical path 372. The switch is a 1×2 switch that controls which test port, and ultimately which port of the component under test, receives the input signal. As depicted in FIG. 3, when the switch is in position A, the input signal is supplied to test port A 322 of the test structure 300 and component port A 312 of the component under test. Conversely, when the switch is in position B, the input signal is supplied to test port B 324 of the test structure and component port B 314 of the component under test. The switch allows the same two ports of the component under test to be characterized in two different directions without having to reverse the orientation of the component under test relative to the test structure. The switch may be manually controlled or electronically controlled.

The two outputs of the switch 336 are optically connected by optical paths 374 and 376 to two 2×2 test couplers. The first test coupler 328 (test coupler A) is optically connected by optical path 378 to test port A 322 and by optical path 380 to a 2×1 receiver coupler 332 that is associated with receiver A (referred to herein as receiver coupler A). When the switch is in position A, test coupler A and optical paths 374 and 378 optically connect the switch to test port A so that the input signal can be delivered to component port A 312 of the component under test. Test coupler A also optically connects the test port A to receiver coupler A so that a reflected optical response signal is delivered to receiver coupler A and ultimately to receiver A 338.

The second test coupler 330 (test coupler B) is optically connected to test port B 324 by optical path 382 and by optical path 384 to a 2×1 coupler 334 that is associated with receiver B 340 (referred to herein as receiver coupler B). When the switch 336 is in position A, test coupler B 330 and optical paths 382 and 384 optically connect test port B 324 to receiver coupler B 334 so that a transmitted optical response signal is delivered to receiver coupler B and ultimately to receiver B.

When the switch 336 is in position B, test coupler B 330 optically connects the switch to test port B 324 so that the input signal can be delivered to component port B 314 of the component under test 302. Upon applying the input signal to component port B, a reflected optical response signal is delivered to receiver B 340 via test port B, test coupler B, and receiver coupler B 334 and a transmitted optical response signal is delivered to receiver A 338 via test port A 322, test coupler A 328, and receiver coupler A 332. In the embodiment of FIG. 3, the optical couplers 326, 328, 330, 332, and 334 are optically directional 3 dB fiber couplers as described above, although other optical couplers may be utilized.

The test ports A 322 and B 324 enable the component under test 302 to be optically connected to the test structure 300. The test ports may be fiber mating sleeve or fiber connectors. In the embodiment of FIG. 3, the test ports are optically connected to the component under test by optical fibers 364 and 366. When the switch 336 is in position A, component port A 312 receives the input signal from the input port 320 and when the switch is in position B, component port B 314 receives the input optical signal from the input port.

Regardless of whether the input signal is delivered to component port A 312 or component port B 314 of the component under test 302, the two optical response signals (reflection and transmission) are directed to the respective receiver couplers, receiver coupler A 332 and receiver coupler B 334. At the receiver couplers, the optical response signals are combined with the portions of the input signal that were split from the incoming input signal at the input coupler 326 and delivered via optical paths 343 and 345. The receiver couplers combine the respective portions of the input signal and the optical response signal and deliver the combined optical signals to the respective receiver via optical paths 386 and 388.

In the embodiment of FIG. 3, the optical paths 343 and 345 that connect the receiver couplers to the input coupler also include polarization controllers 342 and 344, respectively. The polarization controllers enable the polarization state of the input signals to be controlled so that the polarization state of the input signals is aligned with the polarization state of the optical response signals received from optical paths 380 and 384, respectively. Aligning the polarization states of the signals ensures the maximum homodyne beat signal at the output of the receivers. Although the embodiment of FIG. 3 includes polarization controllers, the need for the polarization controllers is eliminated if the receivers 338 and 340 are polarization diversity receivers.

The receivers 338 and 340 are optically connected to receive the combined optical signals from the receiver couplers 332 and 334. In an embodiment, the receivers utilize square law detection as described above with reference to FIG. 2. The signals generated from the receivers are provided to the signal processor 348 via the electrical connections 368. In an embodiment, the receivers are polarization diversity receivers. The signal processor 348 receives electrical signals from the two receivers 338 and 340 and generates output signals that are indicative of optical characteristics of the component under test 302 as described above with reference to FIG. 2.

The test structure 300 includes three monitoring ports 356, 358, and 360 for monitoring portions of the input signal 350 that have not been applied to the component under test 302. One of the monitoring ports 356 is optically connected to the input coupler 326 by optical path 390. The two other monitoring ports are optically connected to the test couplers 328 and 330 by optical paths 392 and 394, respectively. The monitoring ports may be used to monitor the power and polarization state of the local oscillator signal in addition to the stimulus signal at the input and output ports so that precise calibration of the measured parameters can be made.

In operation, an input signal 350, such as a swept local oscillator signal, is input into the input port 320 of the test structure 300. The input signal is split into four portions by the input coupler 326, with two portions going to the receiver couplers 332 and 334, one portion going to the switch 336, and one portion going to the monitoring port 356. Depending on the setting of the switch, the portion of the input signal that enters the switch is applied either to component port A 312 or to component port B 314 of the component under test.

Regardless of whether the switch directs the input signal to component port A 312 or component port B 314 of the component under test 302, the two optical response signals that exit component port A and component port B in response to the input signal are guided by the respective optical paths to the respective receiver couplers 332 and 334. Each receiver coupler combines a portion of the original input signal with the respective optical response signal and outputs the combined optical signal to the respective receiver 338 and 340. The combined optical signals are output to the receivers simultaneously. The two receivers simultaneously output electrical signals that are representative of the optical response signals. The electrical signals are processed by the signal processor 348 to generate simultaneous output signals that represent transmission and reflection characteristics of the component under test. The direction of the test can be switched by simply changing the position of the switch 336.

Although a specific arrangement of the couplers, ports, and a switch have been described, other arrangements of the couplers, ports, and switch are possible. For example, the input coupler 326 may be replaced by multiple 1×2 couplers to split the input signal into the desired number of portions. In addition, although the component under test 302 is a two port optical component in the embodiment of FIG. 3, the test structure 300 can be expanded to accommodate a component under test with more than two ports. An expanded test structure may include a switch with the same number of output ports as ports on the component under test and additional test ports, test couplers, receiver couplers, and receivers to match each additional port of the component under test.

Figure 4:
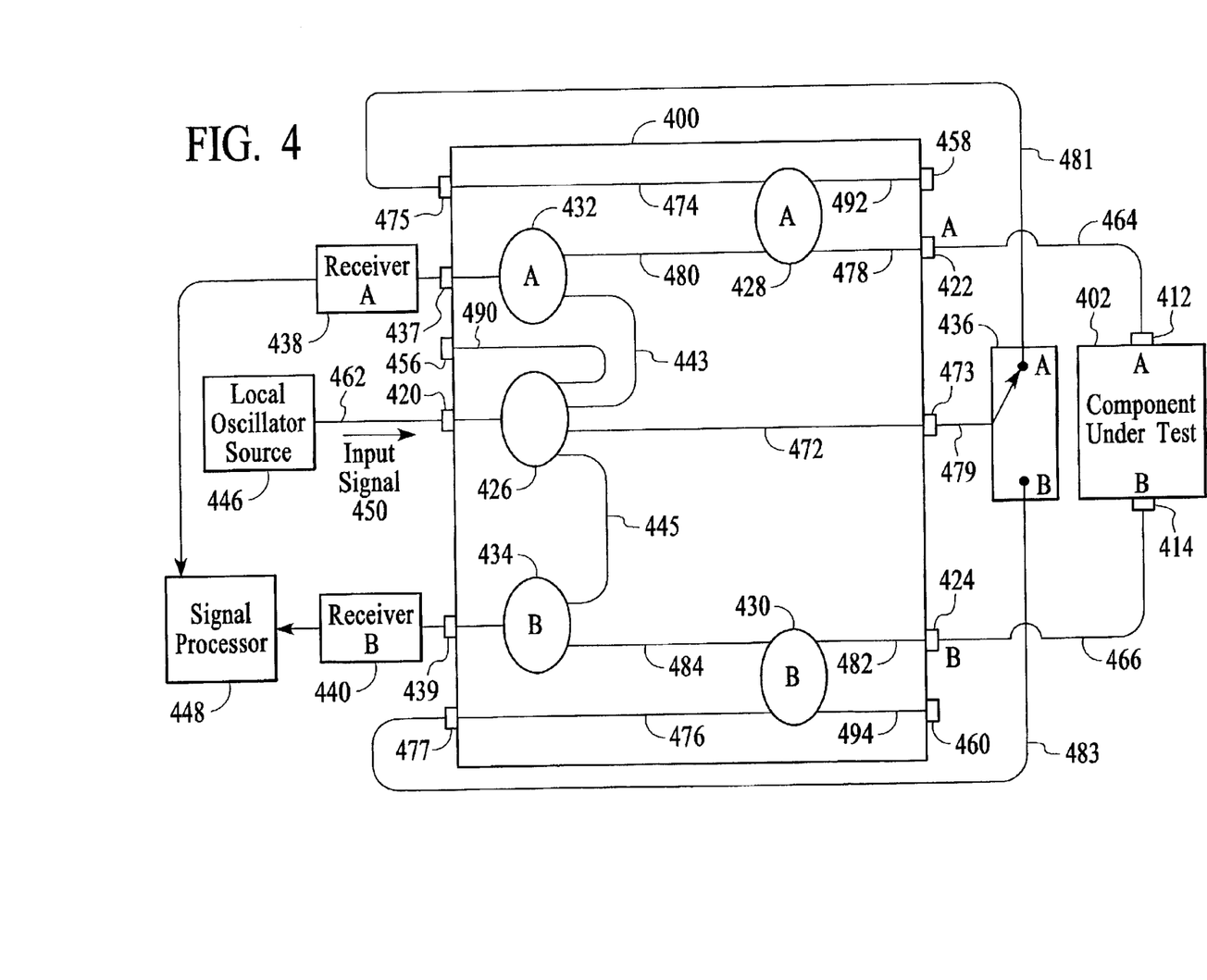
FIG. 4 depicts an embodiment of a test structure that is similar to the test structure of FIG. 3 except that many of the optical components of the test structure are integrated into a single substrate in accordance with an embodiment of the invention.

In addition to the performance characteristics of a test structure that supports the simultaneous characterization of a two port optical component using interferometric-based optical spectrum analysis, an optical component test structure should be reliable and economical to manufacture. Optical systems that are integrated onto planar waveguides are known to be reliable and economical to manufacture. FIG. 4 depicts an embodiment of a test structure 400 that is similar to the test structures 200 and 300 of FIGS. 2 and 3 except that many of the optical components of the test structure are integrated into a single substrate, referred to herein as an integrated waveguide. Specifically, in the embodiment of FIG. 4, the input, test, and receiver couplers 426, 428, 430, 432, and 434 have been integrated into a single substrate. In the embodiment of FIG. 4, the substrate may include any substrate suitable for forming optical paths and optical components such as couplers. For example, the substrate may be a silica, silicon, or other material suitable for fabricating optical waveguides.

In the embodiment of FIG. 4, the integrated waveguide includes eleven ports, a 1×4 input coupler, two 2×2 test couplers, and two 2×1 receiver couplers. The eleven ports include an input port 420, two test ports 422 and 424, two receiver ports 437 and 439, three monitoring ports 456, 458, and 460, an intermediate to-switch port 473, and two intermediate from-switch ports 475 and 477. The input port, the two test ports, and the three monitoring ports perform the same functions as the similarly named ports in the embodiment of FIG. 3. The receiver ports enable the optical response signals to be connected to receivers, receiver A 438 and receiver B 440 respectively, which are external to the test structure 400 in this embodiment. In the embodiment of FIG. 4, the two receivers are polarization diversity receivers.

In the embodiment of FIG. 4, the switch 436 is external to the integrated waveguide (test structure 400). Because the switch is external to the integrated waveguide, the intermediate ports 473, 475, and 477 are used to optically connect the switch (via paths 479, 481, and 483) between the input port 420 and test ports A and B 422 and 424. As depicted in FIG. 4, the to-switch intermediate port 473 is optically connected (via path 479) to the input of the switch so that the input signal can be delivered to the switch. The two outputs of the switch are optically connected to the from-switch intermediate ports 475 and 477 (via paths 481 and 483) such that when the switch is in position A, the input signal is directed to component port A 412 via from-switch intermediate port 475 and test coupler A 428 and when the switch is in position B, the input signal is directed to component port B 414 via from-switch intermediate port 477 and test coupler B 430. The switch can be optically connected to the test structure by, for example, optical fibers.

In operation, an input signal, such as a swept local oscillator signal, is input into the input port 420 of the test structure 400. The input signal is split into four portions by the input coupler 426, with two portions going to the receiver couplers 432 and 434, one portion going to the to-switch intermediate port 473, and one portion going to monitoring port 456. Depending on the setting of the switch, the portion of the input signal that enters the switch is applied either to from-switch intermediate port 475 and then to component port A 412 or to from-switch intermediate port 477 and then to component port B 414.

Regardless of whether the switch directs the input signal to component port A 412 or component port B 414 of the component under test 402, the two optical response signals that exit component port A and component port B of the component under test in response to the input signal are guided by the above-described optical paths to the respective receiver couplers 432 and 434. Each receiver coupler combines a portion of the original input signal with the respective optical response signal and outputs the combined optical signal to the respective receiver ports 437 and 439. The combined optical signals are output to the receiver ports simultaneously. The two polarization diversity receivers 438 and 440 that are connected to the receiver ports simultaneously output electrical signals that are representative of the optical response signals. The electrical signals are processed by the signal processor 448 to generate simultaneous output signals that represent transmission and reflection characteristics of the component under test. The direction of the test can be switched by simply changing the position of the switch 436.

Although specific embodiments of the invention have been described and illustrated, the invention is not limited to the specific forms and arrangements of parts so described and illustrated. The invention is limited only by the claims.

What is claimed is:

1. A test structure that supports the characterization of an optical component comprising:

an input port for receiving an input signal;

first and second test ports for optically connecting said test structure to said optical component, said first test port being optically connectable to said input port such that said input signal can be supplied to said optical component through said first test port;

a first optical path for receiving a first optical response signal from said first test port, said first optical response signal resulting from application of said input signal to said optical component;

a second optical path for receiving a second optical response signal from said second test port, said second optical response signal also resulting from application of said input signal to said optical component; and means for combining a first portion of said input signal with said first optical response signal and for combining a second portion of said input signal with said second optical response signal.

2. The test structure of claim 1 wherein said first optical path includes a first test coupler that optically connects said input port, said first test port, and said means for combining said first portion of said input signal with said first optical response signal.

3. The test structure of claim 1 wherein said means for combining said first portion of said input signal with said first optical response signal and for combining said second portion of said input signal with said second optical response signal includes:
  an input coupler for splitting said input signal;
  a first receiver coupler that is optically connected to said input coupler and to said first optical path and that is optically connectable to a first receiver; and
  a second receiver coupler that is optically connected to said input coupler and to said second optical path and that is optically connectable to a second receiver.

4. The test structure of claim 3 wherein:
  said first optical path includes a first test coupler that optically connects said input coupler, said first test port, and said first receiver coupler; and
  said second optical path includes a second test coupler that optically connects said input coupler, said second test port, and said second receiver coupler.

5. The test structure of claim 4 wherein said input coupler, said first and second test couplers, and said first and second receiver couplers are integrated into a single substrate.

6. The test structure of claim 4 further including:
  a switch that is connected in an optical path that is between said input port and said first and second test ports; and
  an optical path between said switch and said second test port;
  wherein said switch allows said input signal to be applied to said optical component through either said first test port or said second test port.

7. The test structure of claim 1 further including:
  a switch that is connected in an optical path that is between said input port and said first and second test ports;
  an optical path between said switch and said second test port, wherein said switch allows said input signal to be applied to said optical component through either said first test port or said second test port;
  said means for combining said first portion of said input signal with said first optical response signal and for combining said second portion of said input signal with said second optical response signal includes:
    an input coupler for splitting said input signal;
    a first receiver coupler that is optically connected to said input coupler and to said first optical path and that is optically connectable to a first receiver; and
    a second receiver coupler that is optically connected to said input coupler and to said second optical path and that is optically connectable to a second receiver;
  said first optical path including a first test coupler that optically connects said input coupler, said first test port, and said first receiver coupler; and
  said second optical path including a second test coupler that optically connects said input coupler, said second test port, and said second receiver coupler.

8. The test structure of claim 1 wherein said first optical response signal represents a portion of said input signal that is reflected by said optical component and wherein said second optical response signal represents a portion of said input signal that passes through said optical component.

9. The test structure of claim 1 wherein said input signal is a swept highly coherent signal.

10. The test structure of claim 1 further including first and second optical receivers that are optically connected to said means for combining, said first optical receiver being optically connected to receive said combined first portion of said input signal and said first optical response signal and said second optical receiver being optically connected to receive said combined second portion of said input signal and said second optical response signal.

11. The test structure of claim 10 wherein said first and second optical receivers include polarization diversity receivers.

12. The test structure of claim 10 wherein said first and second optical receivers are integrated into said test structure.

13. The test structure of claim 12 further including electrical connection ports for electrically connecting said first and second optical receivers to a signal processor.

14. The test structure of claim 1 wherein said first and second optical paths and said means for combining said first portion of said input signal with said first optical response signal and for combining said second portion of said input signal with said second optical response signal are integrated into a single substrate.

15. A test structure that supports the characterization of an optical component comprising:
  a substrate, said substrate including;
  an input port for receiving an input signal;
  first and second test ports for optically connecting said test structure to said optical component, said first and second test ports being optically connectable to said input port such that said input signal can be supplied to said optical component through either said first test port or said second test port;
  first and second receiver ports optically connectable to first and second receivers;
  a first optical path for supplying a first optical response signal from said first test port to said first receiver port, said first optical response signal resulting from application of said input signal to said optical component;
  a second optical path for supplying a second optical response signal from said second test port to said second receiver port, said second optical response signal also resulting from application of said input signal to said optical component; and
  means for combining a first portion of said input signal with said first optical response signal before said first portion of said input signal and said first optical response signal reach said first receiver port and for combining a second portion of said input signal with said second optical response signal before said second portion of said input signal and said second optical response signal reach said second receiver port;
  said first receiver port being optically connected to receive said first portion of said input signal and said first optical response signal after said signals are combined and said second receiver port being optically connected to receive said second portion of said input signal and said second optical response signal after said signals are combined.

16. The test structure of claim 15 wherein said first optical path includes a first test coupler, integrated into said substrate, that optically connects said input port, said first test port, and said means for combining a first portion of said input signal with said first optical response signal.

17. The test structure of claim 15 further including:
  a to-switch intermediate port for optically connecting said input port to an input of a switch;
  a first from-switch intermediate port for optically connecting a first output of said switch to said first test port; and a second from-switch intermediate port for optically connecting a second output of said switch to said second test port.

18. The test structure of claim 17 wherein said means for combining said first portion of said input signal with said first optical response signal and for combining said second portion of said input signal with said second optical response signal includes:

an input coupler, integrated into said substrate, for splitting said input signal;

a first receiver coupler, integrated into said substrate, that is optically connected to said input coupler, to said first optical path, and to said first receiver port; and a second receiver coupler, integrated into said substrate, that is optically connected to said input coupler, to said second optical path, and to said second receiver port.

19. The test structure of claim 17 wherein:

said first optical path includes a first test coupler, integrated into said substrate, that optically connects said input coupler, said first test port, and said first receiver coupler; and said second optical path includes a second test coupler, integrated into said substrate, that optically connects said input coupler, said second test port, and said second receiver coupler.

20. The test structure of claim 15 wherein said first and second optical response signals are supplied substantially simultaneously to the respective receiver ports.

21. A test structure that supports the characterization of an optical component comprising:

an input port for receiving an input signal;

a switch optically connected to said input port;

first and second test ports for optically connecting said test structure to said optical component, said first and second test ports being optically connectable to said switch such that said input signal can be supplied to said optical component through either said first test port or said second test port;

a first optical path for receiving a first optical response signal from said first test port, said first optical response signal resulting from application of said input signal to said optical component;

a second optical path for receiving a second optical response signal from said second test port, said second optical response signal also resulting from application of said input signal to said optical component;

a first receiver coupler, connected along said first optical path, for combining a first portion of said input signal with said first optical response signal; and a second receiver coupler, connected along said second optical path, for combining a second portion of said input signal with said second optical response signal.

22. The test structure of claim 21 wherein:

said first optical path includes a first test coupler that optically connects said switch, said first test port, and said first receiver coupler; and said second optical path includes a second test coupler that optically connects said switch, said second test port, and said second receiver coupler.

23. The test structure of claim 21 further including an input coupler that optically connects said input port to said switch, said first receiver coupler, and said second receiver coupler.

* * * * *